Patented July 10, 1934

1,965,608

UNITED STATES PATENT OFFICE 1,965,608

ORGANO-METALLIC PROTECTIVE AGENT

Paul L. Salzberg, Wilmington, Del., assignor to E. I. du Pont de Nemours & Company, Wilmington, Del., a corporation of Delaware No Drawing. Application June 19, 1930, Serial No. 462,399

14 Claims. (Cl. 134—79)

This invention relates to a process for improving the durability of coating compositions on exposure to sunlight, and more particularly to a process for increasing the resistance of nitrocellulose to the action of ultra-violet light.

It is well known that nitrocellulose is sensitive to the action of ultra-violet radiation present in sunlight and that its value in coating compositions is limited thereby. Several months of summer exposure is sufficient to completely destroy clear nitrocellulose films.

This invention has as an object a process of producing light colored or colorless nitrocellulose films which are resistant to the deteriorating action of ultra-violet light. A further object is the preparation of nitrocellulose coating compositions durable on exposure to sunlight.

These objects are accomplished by incorporating with the nitrocellulose organic salts of certain metals capable of absorbing the destructive radiation present in sunlight and thus retarding the deleterious action of this radiation on nitrocellulose. These agents comprise organic salts in which the metallic radical is such as to confer good absorption of the ultra-violet light and in which the organic radical is capable of providing solubility of the metallic salt in organic solvents and compatibility with the nitrocellulose.

I have found that organo metallic salts of vanadium, cerium and titanium are effective as ultra-violet filters for this purpose, the salts of cerium and titanium being especially valuable because practically colorless films can be prepared containing these metals. The metals are introduced in the form of salts of those organic acids which will be compatible with the nitrocellulose film.

By compatible salts is meant those salts which are compatible with the dried film as well as with the nitrocellulose solution used for the production of the coating composition. Compatible salts, therefore, produce a clear homogeneous film with the nitrocellulose; are soluble in the same solvents and diluents as the nitrocellulose, and do not have any deleterious effect on the dried film.

Among the metallic salts of organic acids for preventing the deterioration of nitrocellulose by retarding the transmission of ultra-violet light are certain metallic salts of the half esters of phthalic acid as designated by the formula:

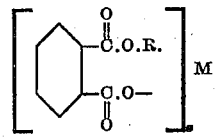

The valence of the metal M is designated by $x$ and R represents an alkyl group which may or may not be carbocyclic or heterocyclic as shown by the following compounds illustrative of the class, the symbol M above or metallic salt below indicating any one of the vanadyl, ceric or titanium salts:

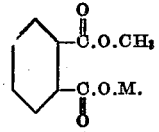

Metallic salt or methyl phthalate

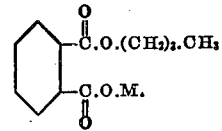

Metallic salt of normal butyl phthalate

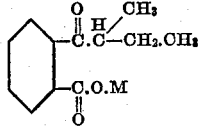

Metallic salt of secondary butyl phthalate

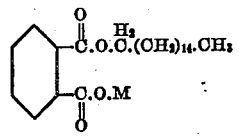

Metallic salt of cetyl phthalate

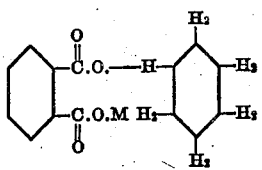

Metallic salt of cyclo hexyl phthalate

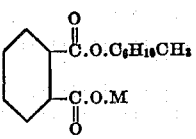

Metallic salt of methyl cyclo hexyl phthalate

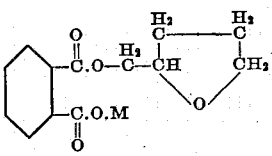

Metallic salt of tetra hydro furfuryl phthalate

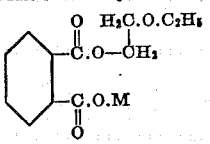

Metallic salt of the mono phthalic ester of mono ethyl ether of glycol

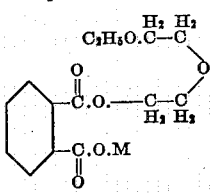

Metallic salt of the mono phthalic ester of the mono ethyl ether of diethylene glycol The metallic salts of the mono phthalic esters of castor oil are also valuable agents for the purpose of this invention.

As an example of unsaturated derivatives of phthalic acid may be mentioned:

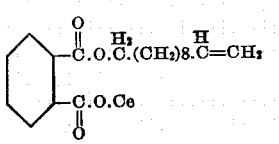

Ceric undecylenic phthalate

The nitrocellulose is used in the form of a 20–25% solution in suitable solvents. A typical nitrocellulose base solution for this purpose may be made according to the following formula:

| | Percent |
|---|---|
| Ethyl acetate | 25.0 |
| Butyl acetate | 20.0 |
| Toluol | 20.0 |
| Denatured alcohol | 10.0 |
| Nitrocellulose | 25.0 |

Other lacquer constituents may be added, such as natural gums, polyhydric alcohol-polybasic acid resins, softeners or pigments.

To this lacquer mixture is then added the organo-metallic salt, preferably dissolved in toluene, butyl alcohol, or other suitable solvent.

In the following examples, I have indicated the method of employing these agents in clear lacquers and the increase in durability that may be obtained by their use. The durability data were obtained by exposing panels coated with the lacquers at an angle of 45° from the vertical position and facing due South.

*Example 1*

One hundred grams of the nitrocellulose base is mixed with a solution containing 10 g. of vanadyl butyl phthalate. The vanadium derivative is unstable in solution but lacquers formulated with freshly prepared solutions give grey-green films which are decidedly more durable than nitrocellulose alone. A film of this type is still in good condition after 120 days exposure whereas the straight nitrocellulose control failed in 40 days.

*Example 2*

One hundred grams of the nitrocellulose base is mixed with a solution of 25 g. of ceric methyl-cyclohexyl phthalate dissolved in a 2/1 mixture of butyl alcohol and toluol. This film is very light yellow and is of value where light color is essential. A film of this type applied over a plain steel surface showed a life of 90 days while a straight nitrocellulose film applied over steel failed in 10 days.

*Example 3*

One hundred grams of the nitrocellulose base is mixed with a solution containing 20 g. of titanium butyl phthalate. The latter agent is prepared from sodium butyl phthalate, and titanous chloride ($TiCl_3.6H_2O$). It is originally dark brown in color but becomes practically colorless when incorporated with nitrocellulose and therefore is valuable for use in light-colored lacquers. A film having the composition described above showed a life of 70 days over steel, while a straight nitrocellulose film failed within 10 days under the same conditions.

*Example 4*

One hundred grams of the nitrocellulose base is mixed with a solution containing 12.5 g. of titanium butyl phthalate. Fourteen grams of a softener, such as dibutyl phthalate, is added. Films from this lacquer applied over an enameled surface were light colored and are still in good condition after 100 days exposure, while an ordinary nitrocellulose lacquer film containing a natural gum failed within 60 days.

Some of the agents, as ceric butyl phthalate, are not entirely satisfactory in nitrocellulose lacquers for out door exposure because they decrease the water resistance of the film. Nevertheless these agents retard the decomposition of nitrocellulose by ultra-violet light and may be used where resistance to water is not essential. Furthermore, the water resistance of salts of this type can be improved by using organic acids of less solubility. Thus ceric methyl-cyclohexyl phthalate is more water resistant than the corresponding butyl phthalate and can be introduced in nitrocellulose films in fairly high proportions without impairing water resistance.

The effectiveness of the organo-metallic salts in increasing the resistance of nitrocellulose to sunlight is proportional to their opacity to ultra-violet light. The following table records the transmission of lacquer films 0.0010″ thick, containing the butyl phthalates.

*Ultra-Violet Transmission of Nitrocellulose Lacquer Films*

| Protective agent | Percentage transmission | |
|---|---|---|
| | 2800–3600 A.U. | 3130 A.U. |
| Vanadyl butyl phthalate | 8.4% | 6.0% |
| Ceric butyl phthalate | 16.6 | 6.5 |
| Titanium butyl phthalate | 23.6 | 5.0 |
| No protective agent | 55.0 | 53.0 |

The ratio of protective agent, nitrocellulose and softener in the film was 1—4—2.

The metal salts of the aromatic mono-carboxylic acids, exemplified by titanium, vanadium or cerium benzoyl benzoate, are also compatible with nitrocellulose and useful as protective agents.

While the metallic salts of the half esters of phthalic acid comprise a preferred class of agents because of the marked compatibility of these compounds with nitrocellulose films, the metals herein disclosed also produce valuable protective agents when combined with other organic radicals capable of conferring the necessary solubility in nitrocellulose solvents and compatibility with the film. The metal salts of the aliphatic acids may be used instead of the phthalates and there may be wide variations in the nature of the organic acid with which the metals are combined as exemplified by the camphorates or succinates as:

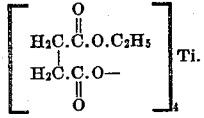

Titanium ethyl succinate

Included within the metal salts of the aliphatic acids are also the very valuable protective agents furnished by the metallic salts of the fatty acids, as the metallic salts of the drying oil acids, i. e., linseed oil acids and chinawood oil acids; the metallic salts of the semi and non-drying oil acids, i. e., castor oil acids. The use of the metals in the form of their soaps as the oleates or linoleates, affords a relatively cheap means of increasing durability. The salts of alicyclic carboxylic acids, such as the naphthenates and the resin acids may also be used. Of especial value are the salts of the resin acids, which include the salts of rosin, known as the resinates and which also include the salts of abietic acid, an acid obtained from rosin.

The following table shows the ultra-violet light transmission values of salts selected from the above noted classes of compounds.

*Ultra-violet transmission of nitrocellulose lacquer films*

| Agent | Percentage of transmission | |
|---|---|---|
| | 2800-3600 A. U. | 3130 A.U. |
| Titanium ethyl succinate | Percent 15.4 | Percent 1.0 |
| Vanadyl ethyl succinate | 0.1 | 0.0 |
| Ceric abietate | 11.7 | 4.4 |
| Ceric salts of Chinawood oil acids | 9.2 | 3.0 |

The above results were obtained on clear lacquer films having a thickness of .00100 inches. The ratio of protective agent, nitrocellulose and softener in the titanium and vanadyl ethyl succinate was 2—4—0; in the ceric abietate 2—4—2 and in the ceric salts of Chinawood oil acids 1—4—2.

In my investigations for the production of light colored or colorless nitrocellulose films which are substantially opaque to ultra-violet light, I have found that light colored films of high opacity to ultra-violet light may be produced by using protective agents which are mixtures of salts of the metals disclosed herein with the salts of the metals, iron, copper or cobalt, which are powerful retarders of ultra-violet light but which deeply color and darken the film. The results obtained by using such mixtures are shown in the following table. The protective agent was a mixture of a titanium and a ferric salt. The softening agent for the film was dibutyl phthalate. One part of this mixed protective agent was used with two parts of nitrocellulose and one part of softener. The first two columns show the ratio of titanium and ferric salts present in one part of the mixed protective agent. The results were obtained on films having a thickness of .00100 inches.

| Composition of protective agent | | Percentage of ultra-violet transmission | |
|---|---|---|---|
| Titanium cyclo hexyl phthalate | Ferric butyl phthalate | 2800-3600 A. U. | 3656 A. U. |
| Percent | | Percent | Percent |
| 100 | 0 | 14.1 | 66.5 |
| 99 | 1 | 13.2 | 52.0 |
| 95 | 5 | 12.1 | 55.5 |
| 90 | 10 | 9.3 | 40.0 |
| 75 | 25 | 0.8 | 7.0 |
| 50 | 50 | 0.7 | 6.0 |
| 25 | 75 | 0.0 | 0.0 |
| 0 | 100 | 0.0 | 0.0 |

The above films were almost completely opaque at 3130 A. U., transmitting only a fraction of one per cent. The transmission values at 3656 A. U. are therefore, given as being more significant.

The first four films containing from 100% to 90% titanium salt and from 0% to 10% ferric salt, were light yellow in color. The last four films containing from 75% to 0% titanium salt and from 25% to 100% iron, became increasingly dark; changing from a light reddish brown to a dark reddish brown. A metal salt of cerium may replace the titanium salt and it is to be understood that the organic radical may be any one that will impart the required compatibility of the salt with the nitrocellulose. Copper or cobalt salts may replace the ferric salt mentioned in the table. Vanadium salts when used alone impart some color to the film and mixtures of vanadium salts with ferric copper or cobalt salts are, therefore, less satisfactory from the standpoint of obtaining light colored films than are the mixtures previously referred to. It is advantageous however, to use mixtures of vanadium salts with titanium or cerium salts for the production of light colored films because the vanadium salts permit less ultra-violet light to pass through the film within the range of 2800–3600 A. U. than do the titanium or cerium salts.

In the foregoing tables indicating the percentage transmission, the wave length range of 2800–3600 A. U. used in testing the ultra-violet transmission of the film embraces the entire wave length range contained in sunlight which is considered to be effective in decomposing nitrocellulose films. The radiation of wave length 3130 A. U. is considered to be particularly effective in decomposing nitrocellulose films.

When the agent for retarding the transmission of ultra-violet light is the metal salt of an organic acid having more than one carboxylic group as phthalic or succinic acid, one of the carboxyl groups is esterified as indicated in the compounds mentioned because the presence of the alkyl group lends solubility to the compound. With respect to the organic radicals, increase in the size of the alkyl group results in improved water-resistance. Thus, ceric methylcyclohexyl phthalate is superior to the corresponding cyclohexyl phthalate, and the latter is superior to ceric butyl phthalate. The introduction of a softening agent, as in ceric castor oil phthalate, improves the flexibility to some degree.

In regard to my improved protective agents comprised by mixtures of vanadium, titanium or cerium salts with iron, copper or cobalt salts, it is to be understood that no claims are made herein to these latter agents per se as this subject matter is claimed in the copending applications of Hamilton Bradshaw, Serial Numbers 462,397 and 462,398, filed June 19, 1930.

The selection of the organic salts of the metals mentioned as agents for the retardation of ultra-violet light is based upon the solubility of the salt and on its compatibility with the nitrocellulose film. All metals will not confer to the organic compounds the property of rendering nitrocellulose films opaque or substantially so to ultra-violet light and the metals cerium or titanium only are capable of producing really light or colorless films that are substantially opaque to ultra-violet light. Zinc butyl phthalate, for instance, exercises no protective influence in preventing deterioration of nitrocellulose by ultraviolet light. While each of the metals mentioned have more than one valence, they are generally used in their ordinary or most stable state of valence. As exemplifying a difference in transmission value corresponding to a difference in valence, the butyl phthalate of the metal cerium has an ultra-violet light transmission value of 20% at 3130 A. U. when in the cerous or tri-valent state, but transmits only 6.5% in the ceric or tetra-valent state. Although some of the metals may be introduced in a lower state of valence, oxidation occurs to convert the metal to its state of higher valency and it is in this form that the protective agents are most satisfactory.

When the metals are combined with suitable organic radicals, to form agents compatible with the nitrocellulose film, other than those mentioned, the percentages of ultra-violet transmission are not appreciably changed when the various agents are used in the necessary proportion to make the metal effective as a retarder of the transmission of ultra-violet light through the film.

The proportion of the metallic derivative to be incorporated will vary with the degree of durability required and the particular derivative employed; other factors being equal, the higher the metallic content of the derivative used, the greater in general will be the degree of protection afforded against ultra-violet light. As a general indication it may be stated that in manufacturing clear nitrocellulose lacquers, I prefer to introduce a sufficient quantity of the organo-metallic salt to confer upon the dried lacquer film almost complete opacity to the most harmful ultra-violet radiation present in sunlight. For satisfactory results the transmission should not exceed 10% at 3130 A. U. and should not exceed 25% for the entire range of wave lengths in sunlight. In accordance with the ultra-violet light transmission measurements, the vanadyl salts are the most effective in retarding light-decomposition of nitrocellulose. The agents give very satisfactory results if used in the proportion previously mentioned, namely 3 parts of the agent to 12 parts of nitrocellulose. I prefer to use the cerium or titanium derivatives in larger proportions, say 6-12 parts of the agent to 12 parts of nitrocellulose. The ceric and titanium derivatives while not as effective as the vanadyl agents are valuable because of their light color.

Although the vanadyl agents do not produce films as light in color as the ceric and titanium agents, the greyish green imparted to the film by the vanadyl agents is somewhat neutralized by the yellow of the film. Too much of the metal salt gives water sensitive films. It is therefore, not usually practicable to use more than one part of agent with one part of nitrocellulose.

The present process for improving the durability of nitrocellulose has proved particularly valuable in the case of clear nitrocellulose lacquers. In the case of enamels, opacity to ultra-violet light is obtained by the presence of the pigment, and hence the addition of the agents described above do not have as marked an effect in retarding light decomposition. It is likely, however, that these agents would be effective in improving the durability of nitrocellulose plastics and may be particularly advantageous in laminated glass, the connecting nitrocellulose film of which is known to deteriorate in sunlight.

The process of improving the durability of nitrocellulose films by the incorporation of organo-metallic salts is particularly advantageous because it can be accomplished without sacrifice in the drying-time or hardening rate of the lacquer film. Nitrocellulose lacquers containing oil-modified polyhydric alcohol-polybasic acid resins show fair durability, but are slower drying than nitrocellulose itself. The incorporation of materials of the type disclosed in this invention has no effect on the drying rate and leads to a lacquer having much better durability than the slower drying lacquers containing oleoresinous materials.

A portion of the material disclosed herein is claimed in copending application Serial No. 726,108, filed May 17, 1934.

As many apparently widely different embodiments of this invention may be made without departing from the spirit and scope thereof, it is to be understood that I do not limit myself to the specific embodiments thereof except as defined in the appended claims.

I claim:

1. A composition comprising nitrocellulose and a nitrocellulose-compatible metal salt of a half ester of an aromatic dicarboxylic acid, the metal in said salt being selected from the group consisting of vanadium, cerium and titanium.

2. A composition comprising nitrocellulose and a nitrocellulose-compatible metal salt of a half ester of phthalic acid, the metal in said salt being selected from the group consisting of vanadium, cerium and titanium.

3. A composition comprising nitrocellulose and a metal salt of the half butyl ester of phthalic acid, the metal in said salt being selected from the group consisting of vanadium, cerium, and titanium.

4. A composition comprising nitrocellulose and the titanium salt of a half ester of phthalic acid.

5. A composition comprising nitrocellulose and the titanium salt of the half butyl ester of phthalic acid.

6. A composition comprising nitrocellulose and a nitrocellulose-compatible metal salt of an alicyclic carboxylic acid of the class consisting of resin acids and naphthenic acids, the metal in said salt being selected from the group consisting of vanadium, cerium and titanium.

7. A coating composition comprising nitrocellulose and a nitrocellulose-compatible metal salt of an organic carboxylic acid of the class consisting of drying, semi-drying, and non-drying oil acids, resin acids, naphthenic acids, mono-carboxylic acid esters, and mono-carboxylic aromatic keto acids, the metal in said salt being selected from the group consisting of vanadium, cerium and titanium, and the salt being present in an amount sufficient to reduce the transmission of ultra violet light by a clear film of the composition .001" thick to less than 25% at 2800-3600 A. U. and less than 10% at 3130 A. U.

8. A coating composition comprising nitrocellulose and a nitrocellulose-compatible metal salt of a half ester of an aromatic dicarboxylic acid, the metal in said salt being selected from the group consisting of vanadium, cerium and titanium, and the salt being present in an amount sufficient to reduce the transmission of ultra violet light by a clear film of the composition .001" thick to less than 25% at 2800-3600 A. U. and less than 10% at 3130 A. U.

9. A coating composition comprising nitrocellulose and a nitrocellulose-compatible metal salt of a half ester of phthalic acid, the metal in said salt being selected from the group consisting of vanadium, cerium and titanium, and the salt being present in an amount sufficient to reduce the transmission of ultra violet light by a clear film of the composition .001" thick to less than 25% at 2800-3600 A. U. and less than 10% at 3130 A. U.

10. A coating composition comprising nitrocellulose and a metal salt of the half butyl ester of phthalic acid, the metal in said salt being selected from the group consisting of vanadium, cerium, and titanium and the metal salt being present in an amount sufficient to reduce the transmission of ultra violet light by a clear film of the composition .001" thick to less than 25% at 2800-3600 A. U. and less than 10% at 3130 A. U.

11. A coating composition comprising nitrocellulose and the titanium salt of a half ester of phthalic acid, the titanium salt being present in an amount sufficient to reduce the transmission of ultra violet light by a clear film of the composition .001" thick to less than 25% at 2800-3600 A. U. and less than 10% at 3130 A. U.

12. A coating composition comprising nitrocellulose and the titanium salt of the half butyl ester of phthalic acid, the titanium salt being present in an amount sufficient to reduce the transmission of ultra violet light by a clear film of the composition .001" thick to less than 25% at 2800-3600 A. U. and less than 10% at 3130 A. U.

13. A coating composition comprising nitrocellulose and a nitrocellulose-compatible metal salt of an aliphatic carboxylic acid of the class consisting of drying, semi-drying, and non-drying oil acids, the metal in said salt being selected from the group consisting of vanadium, cerium and titanium, and the salt being present in an amount sufficient to reduce the transmission of ultra violet light by a clear film of the composition .001" thick to less than 25% at 2800-3600 A. U. and less than 10% at 3130 A. U.

14. A coating composition comprising nitrocellulose and a nitrocellulose-compatible metal salt of an alicyclic carboxylic acid of the class consisting of resin acids and naphthenic acids, the metal in said salt being selected from the group consisting of vanadium, cerium and titanium, and the salt being present in an amount sufficient to reduce the transmission of ultra violet light by a clear film of the composition .001" thick to less than 25% at 2800-3600 A. U. and less than 10% at 3130 A. U.

PAUL L. SALZBERG.